United States Patent [19]

Fukami

[11] 4,014,235
[45] Mar. 29, 1977

[54] APPARATUS FOR BANDSAWING OPERATION WITH PROFILING MECHANISM CAPABLE OF AUTOMATIC COPYING OF A MODEL

[75] Inventor: Toshihiro Fukami, Toyohashi, Japan

[73] Assignee: Fukami Co., Ltd., Toyohashi, Japan

[22] Filed: Mar. 10, 1975

[21] Appl. No.: 556,778

Related U.S. Application Data

[62] Division of Ser. No. 367,568, June 6, 1973, Pat. No. 3,882,742.

[30] Foreign Application Priority Data

June 15, 1972   Japan .......................... 47-059873

[52] U.S. Cl. ................................ 83/565; 83/413; 83/809; 83/820
[51] Int. Cl.² ........................................ B26D 1/54
[58] Field of Search ............ 83/413, 809, 810, 820, 83/565

[56] References Cited

UNITED STATES PATENTS

| | | | |
|---|---|---|---|
| 2,774,131 | 12/1956 | Crane | 83/809 X |
| 2,843,917 | 7/1958 | Crane et al. | 83/820 X |
| 3,259,155 | 7/1966 | Kawabata | 83/820 X |
| 3,587,378 | 6/1971 | Oppenheim | 83/565 X |
| 3,593,615 | 7/1971 | Shelton | 83/565 X |
| 3,662,637 | 5/1972 | Glastra | 83/820 |

Primary Examiner—Willie G. Abercrombie
Attorney, Agent, or Firm—Woodhams, Blanchard and Flynn

[57] ABSTRACT

A bandsawing apparatus for performing curvilinear cutting on the work material, while automatically copying a model, without any specific proficiency in the machine handling during the cutting operations. The profiling mechanism incorporated for use with this band sawing machine is of semi-mechanical and semi-electrical construction in combination with certain electric devices.

13 Claims, 8 Drawing Figures

APPARATUS FOR BANDSAWING OPERATION WITH PROFILING MECHANISM CAPABLE OF AUTOMATIC COPYING OF A MODEL

This is a division of copending application Ser. No. 367,568, filed June 6, 1973, now U.S. Pat. No. 3,882,742.

FIELD OF THE INVENTION

The present invention relates to a new and useful bandsawing operation using a uniquely constructed band sawing machine with profiling mechanism incorporated therein which is specifically capable of cutting the material in a curvilinear manner.

BACKGROUND OF THE INVENTION

This invention is basically intended for an ease of general cutting work of the band sawing machine, particularly of curvilinear cutting operations by the uniquely constructed band sawing machine with profiling means incorporated, which have long been required but deemed very difficult to be realized in consideration of the conventional construction of the band sawing machine per se as well as the configuration of the bandsaw blades. Such bandsaw blade has a body portion of a far wider breadth than that of the cutting edge portion thereof, normally by several times as wide. Therefore, usually it is considerably difficult, or rather practically impossible to turn the direction of cutting on the working material during such saw-cutting operations in an attempt to perform such curvilinear cutting work. If such curvilinear cutting operation is practiced by using the conventional band sawing machine plus such bandsaw blade of broad width, it would jeopardize such turning procedures for changing the direction of cutting correctly and accurately as desired due to the interference of the bandsaw blade with a work material or a work, and further if such attempts to change the direction of cutting should nevertheless be carried on forcibly against such interference of the blade, there would inevitably be an improper resistance on the bandsaw blade, which should result in occasional damage to the work or even breakage of the cutting edge portion of the blade.

In consideration of the abovementioned inconveniences and limitations in the cutting operations due to the conventional band sawing machine, it is not recommendable to forcibly perform such curvilinear cutting operations except for only a slightly curved cutting operation. In the conventional band sawing machine, however, it requires considerably awkward operations, should such curvilinear cutting operations be tried therewith, such as initially performed a preliminary rectilinear cutting roughly tangential to the desired cutting line or contour, and subsequently repeating the cutting operations once or more for trimming purposes so as to finally obtain such cutting line and/or contour as is somehow close to the designed cutting line so predetermined.

In consideration of the above stated defects and inconveniences in the cutting operations using the conventional band sawing machine which have long been regarded inherent to the conventional design and construction of the band sawing machine or the configuration of the bandsaw blade, it would be advantageous to provide a band sawing machine designed to perform general curvilinear cutting operations in the following manner and obviate the abovementioned defects and problems specific to the band sawing machine of the conventional esign and construction.

It is therefore a primary object of the present invention to provide a band sawing machine which is of such specific design or construction that enables the sawing operational portion of the machine or the bandsaw blade per se to be deflectable precisely around the bandsaw blade cutting edge portion as the center of such deflecting action, thus permitting the bandsaw blade to be orientated to every point of cutting along the predetermined cutting line or contour on the material, thereby to permit a precise curvilinear cutting operation on the material feed into the cutting position of the band sawing machine, according to the predetermined direction wherever so required, while accurately copying a model or template and preventing any harmful and improper strains from occurring at the cutting edge portion of the bandsaw blade during the sawing operations.

It is another object of this invention to provide a band sawing machine with a profiling mechanism incorporated therein, which is capable of converting the amount of detection obtained at the profile sensing member thereof into the amount of the revolution in either forward or reversed direction of an electric motor, thereby driving a bandsaw blade deflection operating member so as to precisely and reliably cause a travelling of the bandsaw blade according to the curved configuration or profile of a work model, whereby it is possible to obtain a correct and accurate cutting configuration of the work material as desired.

It is a further object of this invention to provide a band sawing machine with a profiling mechanism incorporated therein, wherein there is provided a delivery member, which is adapted to deliver the work material or work into a cutting position toward the bandsaw blade, freely movably in a direction perpendicular to the direction of the material delivery so as to follow up with the configuration or profile of the work model, and such delivery motion may be performed by means of a pneumatic mechanism which is controllable by a profiling valve functioning upon the actuation of the abovementioned profile sensing member, whereby the work material to be cut may be caused to move in the abovementioned perpendicular direction by a predetermined amount of travelling irrespective of the cutting resistance to be encountered during the cutting operation, thus permitting a precise curvilinear cutting operation in full conformity with the profile of the work model.

The nature, principle, and details of the present invention, as well as further characteristics and advantages thereof, will become more apparent from the following detailed description with respect to a preferred embodiment of the invention when read in conjunction with the accompanying drawing, in which like parts or portions are designated by like reference numerals.

DETAILED DESCRIPTION

Figure 1:
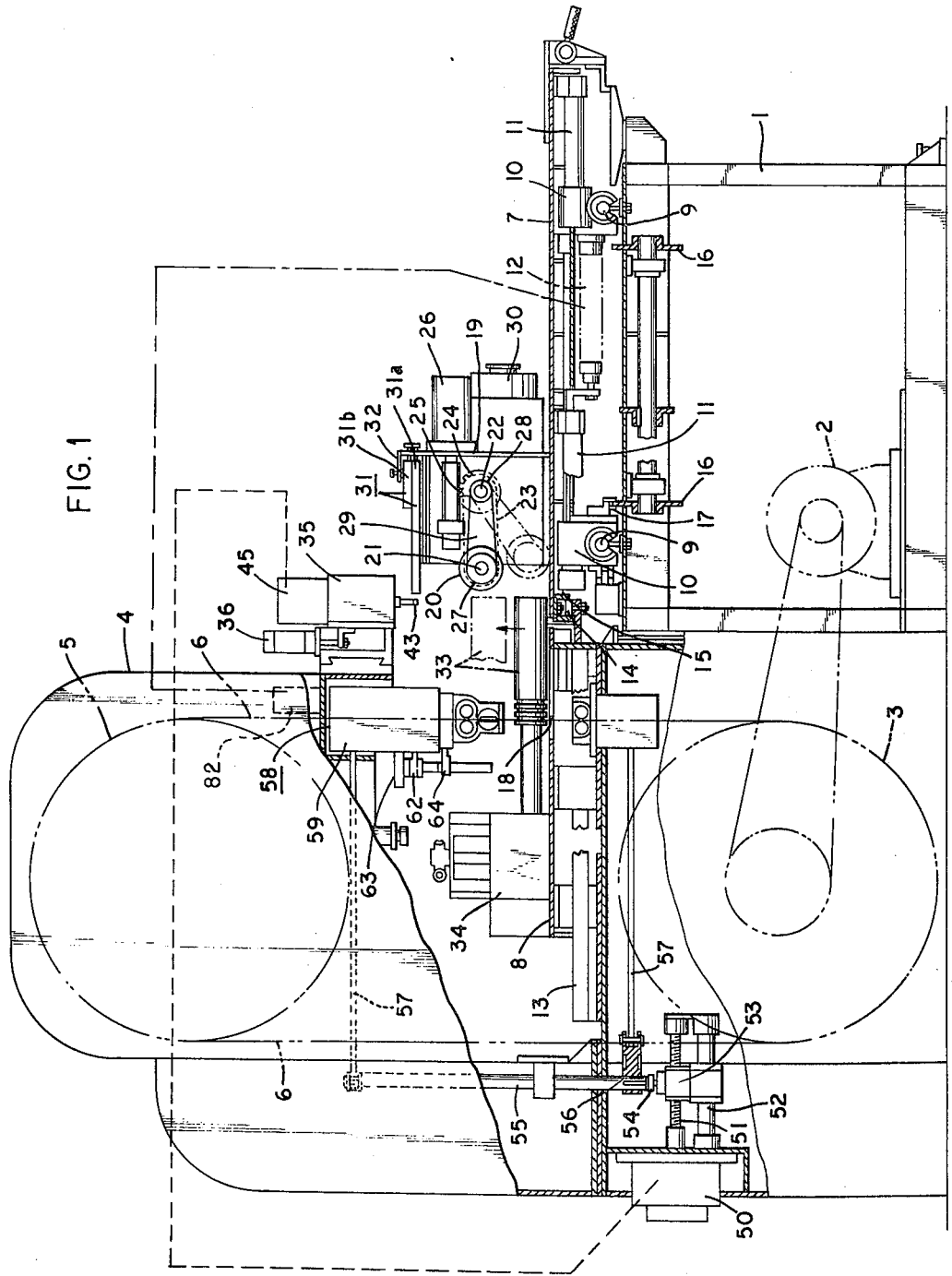
FIG. 1 is a side elevational view, in vertical cross-section, showing a band sawing machine according to the present invention.

Referring to the accompanying drawings, which show for illustrative purpose only but not in any way for limitations one preferred embodiment of a band sawing machine according to the present invention, there is shown a machine base 1, in which there is provided a bandsaw driving wheel 3 driven by a prime mover such as an electric motor 2, and there is provided a driven wheel 5 on a bandsaw housing or arm 4 which is disposed on the machine base 1. There is a bandsaw blade 6 provided between the driving wheel 3 and the driven wheel 5.

Before going any further, it is intended to define certain terms for expressing the direction of action or movement in this specification as well as the appended claims, i.e., "longitudinal" or "longitudinally" is used to indicate a direction fore-and-aft in a plane perpendicular to the face of attached drawings, while "transversal" or "transversally" is used to depict a direction designated in a plane in parallel with the face of drawings, in other words, to and from right and left along the drawing face, and the word "vertical" or "vertically" is used to mean a movement or action in a plane in parallel to but from the upper side down to the lower side of the drawing face.

Referring now to FIG. 1, on the upper surface of the machine base 1, there are a delivery table 7 provided movably both longitudinally and transversally and a jig table 8 which is on the other hand provided movably only transversally.

There are provided two rails 9,9 toward a direction perpendicular to the face of the drawing or longitudinally on the right portion of the machine base 1 as viewed in FIG. 1, and with respect to those rails 9,9 there are providded a pair of tracks 10,10 in slidable engagement therewith. Said tracks 10,10 are adapted to engage slidably with guide rods 11,11 provided under the delivery table 7 extending transversally as viewed in the same drawing figure.

Consequently, the delivery table 7 is capable of travelling in the longitudinal direction as viewed in the drawing figure by virtue of the relationship between the rails 9,9 and the tracks 10,10, as well as in the transversal direction, which is at a right angle to the abovementioned direction by virtue of the relationship between the trakcs 10,10 and the guide rods 11,11. There is further provided an air cylinder 12 between the tracks 10 and the delivery table 7.

On the left portion of the machine base 1, there is provided a guide rod 13 in the transversal direction as viewed in FIG. 1, and along this guide rod 13 provided is the jig table 8 slidably in the transversal direction.

The delivery table 7 and the jig table 8 are arranged to be positioned on the same plane, and there are provided rollers 14 at the end portion of the jig table 8 toward the delivery table 7. Said rollers 14 are adapted to engage with a channel 15 extending longitudinally at the end portion of the delivery table 7.

There is provided a sprocket 16 throughout the longitudinal depth of the machine base 1, which is driven by a motor (not shown), and as the sprocket chain 17 in mesh with the sprocket 16 is operatively connected to the abovementioned tracks 10,10, the delivery table 7 is caused to move longitudinally along the depth of the machine base 1 owing to the driving force from the motor.

During the longitudinal operation of the delivery table 7, the rollers 14 of the jig table 8 will rotate only idly within the channel 15 of the delivery table 7, and therefore, the jig table 8 will not be moved, while, as will be further described hereinafter, during the profiling operation of the delivery table 7, wherein the delivery table 7 is caused to move longitudinally while moving transversally, the jig table 8 is caused to move transversally according to the transversal movement of the delivery table 7, while permitting a longitudinal movement of the delivery table 7 through function of the rollers 14.

The jig table 8 is provided with a notched portion 18 which is adapted to position the bandsaw blade 6 therewithin during the whole stroke of travelling in the transversal direction.

On the upper surface of the delivery table 7, there is provided a feed roller 20 for the delivery of the material to be cut, which roller is mounted in the supporting frame 19 which is detachable with respect to the delivery table 7. That is to say, the shaft 21 of the feed roller 20 is stemmed from the end portion of the rotating arm 23 which is pivoted on the shaft 22, and by virtue of the structural relationship between a pinion 24 provided at the pivotal base of the rotating arm 23 and a rack 25 engaging with the pinion, the feed roller 20 is caused to swingably move in the vertical direction by function of an air cylinder 26 which is connected to the rack 25. Moreover, there are provided sprockets 27,28 on the shafts 21,22, respectively, and there is a sprocket chain 29 connected between these sprockets 27,28. Therefore, the roller 20 is caused to rotate by the power transmission form the motor 30 in close proximity to the delivery table 7, thus delivering the material to be cut with respect to the jig table 8.

There is provided a fixing member 32 for a work model (i.e., template) 31 in position above the upper surface of the supporting frame 19. Upon the jig table 8, there is a feed roller 33 provided movably in the vertical direction with respect to a supporting frame 34, which roller 33 is adapted to grip the work material in a gap between the roller and the jig table 8, so as to deliver the work material toward the bandsaw blade 6 at right angles to the direction of delivery caused by the transversal movement of the table 8.

A profile sensing member 35 is provided movably in the vertical direction at the mounting section inside the bandsaw housing or arm 4 and adapted to be moved in the vertical direction by function of the air cylinder 36.

Figure 2:
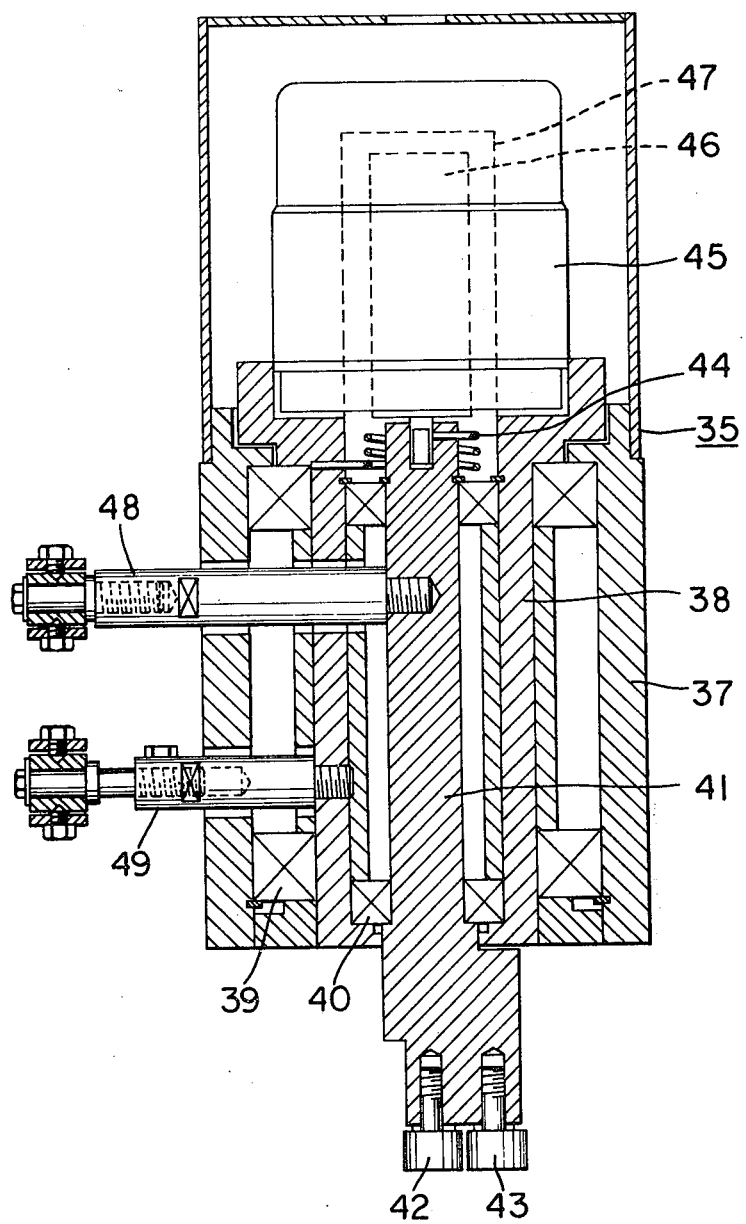
FIG. 2 is an enlarged vertical cross-sectional view, showing a profile sensing member of the machine.
Figure 3:
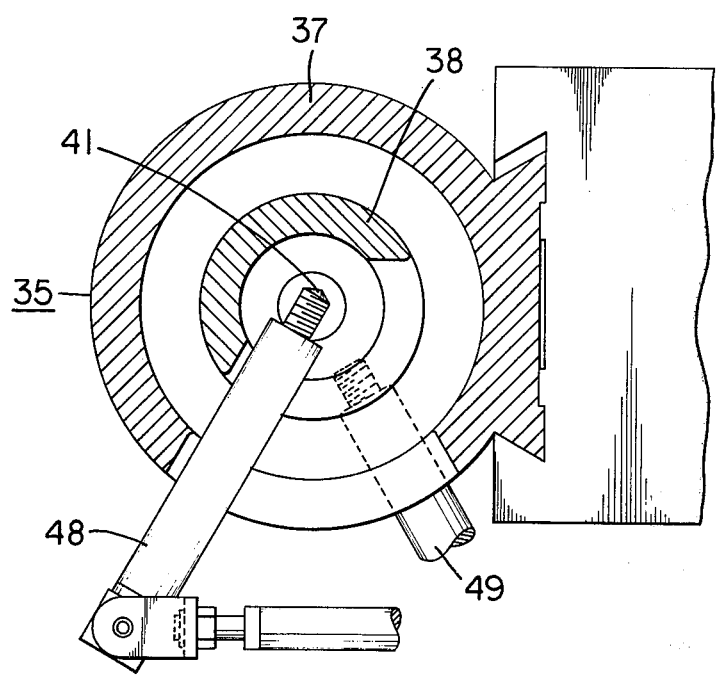
FIG. 3 is an enlarged transversal cross-sectional view, showing the profile sensing member of the machine.
Figure 4:
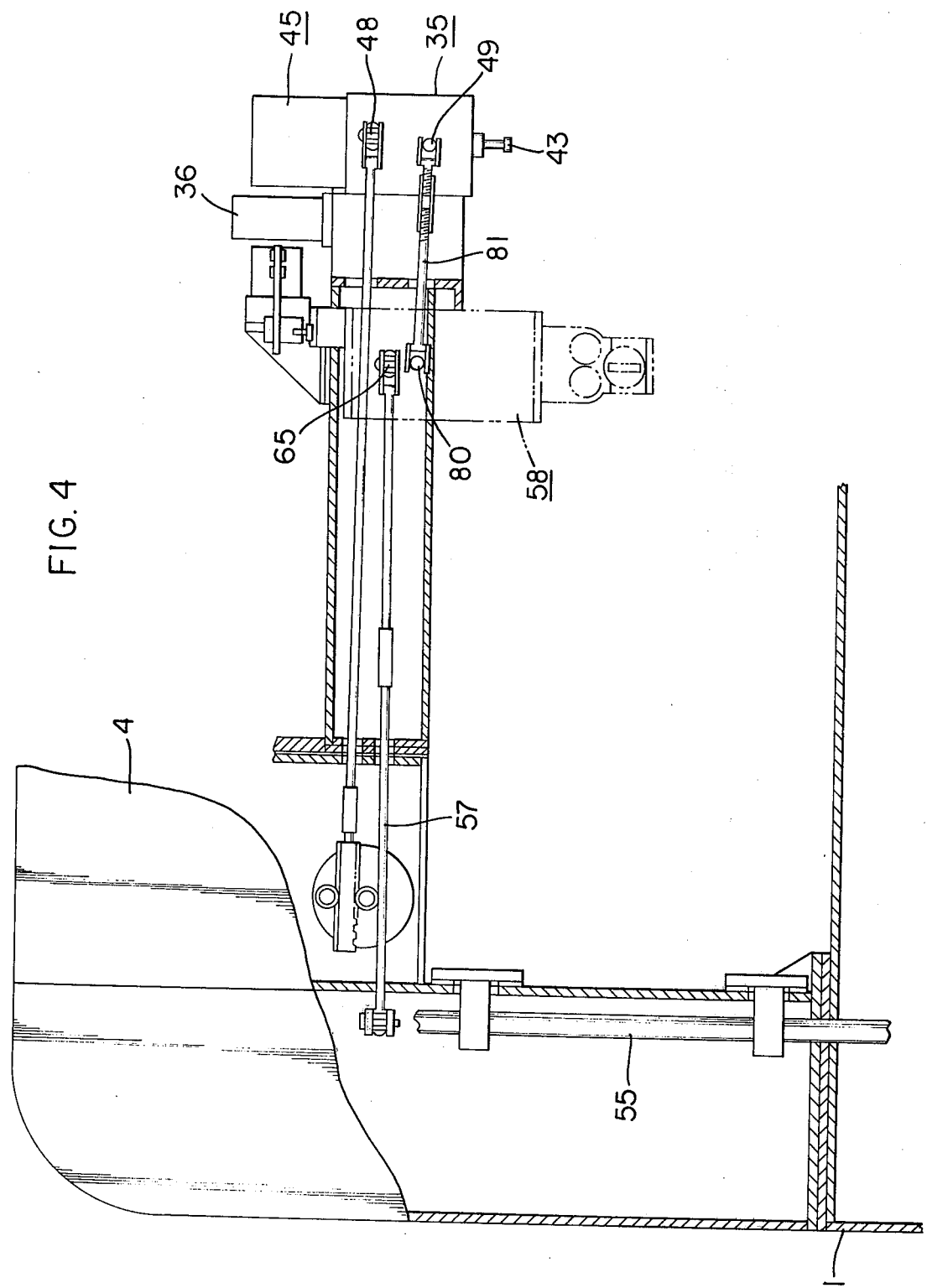
FIG. 4 is an enlarged view of an interlocking lever portion of the machine.

In the profile sensing member 35 (FIG. 2), an inner cylinder 38 is rotatably supported through a bearing 39 inside of an outer cylinder 37, and there is further provided a shaft 41 which is freely rotatably supported within cylinder 38 by bearings 40.

At the lower end of shaft 41 there is mounted a pair of rotatable rollers 42 and 43. The roller 42 is substantially aligned with the axis of the shaft 41 and this roller is normally maintained in engagement with the template 31, due to the template being urged into engagement with this roller by the pressure cylinder 12. The other roller 43 is eccentrically (radially) positioned outwardly from the roller 42 and is hence disposed outwardly from the axis of the shaft 41. This roller 43 is also positioned for engaging the profile of the template 31. At the upper portion of the rotatable shaft 41 there is mounted a coiled torsion spring 44, one end of which is carried by the shaft 41, while the other end of which is hooked to the inner cylinder 38. This spring thus tends to rotate the shaft 41 so that the roller 43 is accordingly urged into engagement with the profile of the template 31. For this reason, the roller 43 is commonly referred to as a sensing roller in that it senses the profile of the template, whereas the roller 42 is commonly referred to as the fulcrum roller since it merely defines the pivot axis for the shaft 41.

Furthermore, to the upper end of the rotating shaft 41 is connected a primary rotor 46 of a conventional electrical displacement detecting device 45, while a secondary stator 47 thereof is connected to the upper end of the above-mentioned inner cyclinder 38.

There is provided a rod 48 for manually controlling the profiling operation and another rod 49 for the shaft feedback operation, which rods are connected to the rotating shaft 41 and the inner cylinder 38, respectively and disposed extending outwardly out of the notched section of the outer cylinder 37.

The rollers 42,43 thus follow the contour or profile of the template 31 due to the urging of the template against the roller 42 as caused by the cylinder 12, and due to the urging of the roller 43 against the profile of the template by the spring 44. The spring 44, in urging the roller 43 to thus follow the profile of the template, accordingly results in a rotatable displacement of the shaft 41 relative to the surrounding sleeve 38. This rotational displacement of shaft 41 and the corresponding rotational displacement of the rotor 46 is thus electrically converted to an output potential by the displacement detecting device 45, and this output potential is then applied to a motor 50 (as indicated by the dotted line in FIG. 1) through a device for controlling a d/c servo motor, thus resulting in a forward or reversed sense of the rotation of the abovementioned motor 50.

The resultant rotation of the motor 50 rotates a threaded rod 51 which is interconnected to the motor, and thus by function of a guide lever 52 this rotating motion is converted to the linear motion of a travelling nut member 53 which is threadedly engaged with the rod 51. This linear motion is then converted through a crank arm 54 to the rotating motion of a vertical rod 55, and further converted through further crank arms 56 to the transversal motion of upper and lower horizontal connecting rods 57,57, thus finally actuating deflection operating members 58 of the band sawing machine.

The deflection operating members 58 of the band sawing machine are adapted to forcibly deflect the bandsaw blade which is running through the notched portion 18 in the jig table 8, and are provided both on the bandsaw housing or arm 4 and the machine base 1 as arranged corresponding to the abovementioned upper and lower horizontal connecting rods 57,57, respectively.

Figure 5:
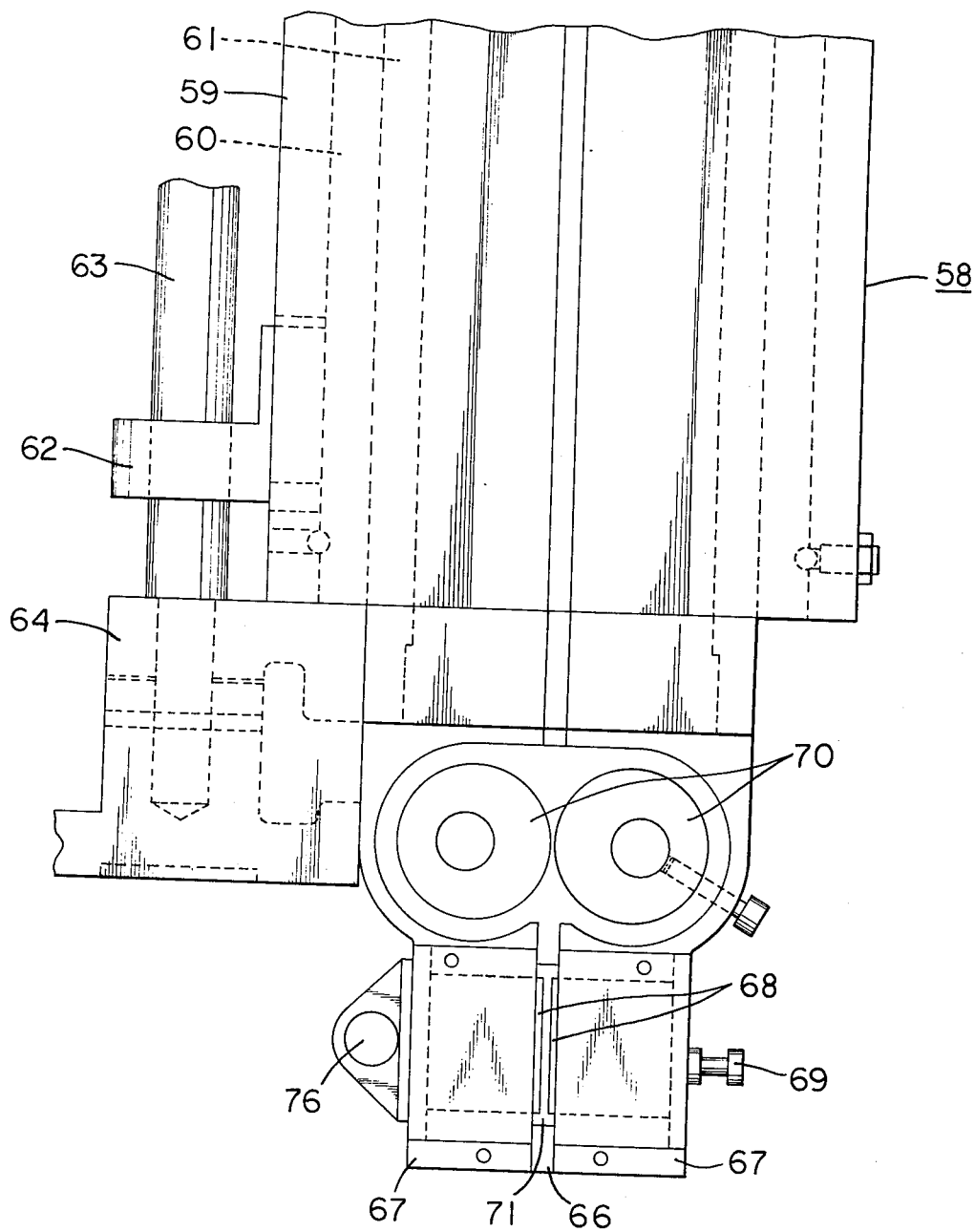
FIG. 5 is a front elevational view, showing the main elements of a bandsaw blade deflection operating member of the machine.

The following description is given on one of the bandsaw deflection operating members 58 which is installed on the bandsaw housing or arm 4, since the other member 58 mounted on the machine base 1 is entirely indentical in structure and function. A rotating cylinder 60 (FIG. 5) is rotatably carried within a stationary cylinder 59, and sliding cylinder 61 is adapted to vertically slide within the abovementioned rotating cylinder 60.

Illustratively stated, the lower threaded rod portion of an adjusting handle 63 installed on the arm 62 fixed on the rotating cylinder 60 is threadedly engaged with an arm 64 fixed on the sliding cylinder 61, so that the sliding cylinder 61 is selectively orientated in a vertical position by a rotating operation of the adjusting handle 63.

A crank arm 65 is connected to the rotating cylinder 60 and protrudes outwardly out of the notched portion of the stationary cylinder 59. The abovementioned horizontal connecting rod 57 is connected to the outmost end of the crank arm 65, so that the rotating cylinder 60 and the sliding cylinder 61 will be caused to rotate with respect to the stationary cylinder 59 through the crank arm 65 which is subjected to the transversal motion of the abovementioned horizontal connecting rod 57.

At the lower end of the sliding cylinder 61, the front side portion thereof is partially recessed, while at the rear side portion there are bandsaw blade guide seats 67,67 (FIG. 5) on the opposite sides thereof through a groove 66. Bandsaw blade guides 68 are fitted to the abovementioned seats 67,67 respectively, by means of a bolt 69. Above these bandsaw blade guide seats 67, there are provided guide rollers 70 corresponding to the abovementioned bandsaw blade guides 68.

Figure 6:
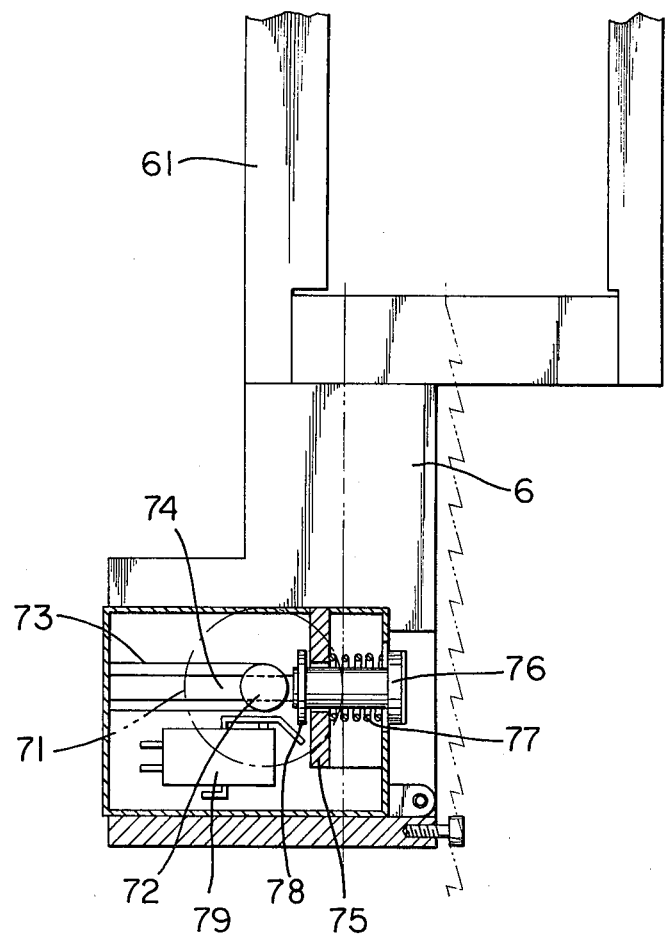
FIG. 6 is a side elevational view of FIG. 5, partly in section.

At the rear portion of the bandsaw blade guide seats 67, there is provided a backing roller 71 (FIG. 6) for the bandsaw blade. A shaft 72 of the backing roller 71 is adapted to move back-and-forth reciprocatively with sent or groove 73 on the cylinder body 61. With one end of said shaft 72 an adjusting threaded rod 74 is engaged threadedly. Said threaded rod 74 extends forwardly through a supporting portion 75 thereof and a compression spring 77 is provided between a head portion 76 of the abovementioned rod 74 and the supporting portion 75. Therefore, the roller 71 is biased forwardly, and by rotating the threaded rod 75, the compressive force of the compression spring 77 may be duly adjusted, so that the resisting force of the backing roller 71 against the bandsaw blade can be adjsuted to a desired level.

To the adjusting threaded rod 74, there is additionally provided a contact plate 78 at the rear portion of the supporting portion 75 and a limit switch 79 is positioned within the travelling range of the contact plate 78. Accordingly, when there occurs an overload on the bandsaw blade during cutting operations, the adusting rod 74 will be caused to retract together with the roller 71 against the force of the spring 77 and the limit switch 79 is then caused to function by the contact plate 78 so as to stop the operation of the sawing machine, thus preventing the possible breakage of the bandsaw blade due to an improper operation of the machine.

During the normal operation of the band sawing machine wherein the bandsaw blade is supported by the backing roller 71, the cutting edge portion of the bandsaw blade is duly located along the center or axis of the rotating motion of either the rotating cylinder 60 or the sliding cylinder 61. When the band sawing machine is operated with a tangentially deflecting operation to perform a curvilinear cutting procedures, the bandsaw blade 6 is caused to rotate with the cutting edge portion thereof as the center of rotating motion thereof.

A crank arm 80 is connected to the rotating cylinder 60 and extends radially outwardly through the notched portion of the stationary cylinder 59. Said crank arm 80 is further connected through an interlocking rod 81 to the connecting arm 49 fixed to the inner cylinder 38 of the profile sensing member 35 so as to permit a motion feedback between profile sensor 35 and operating device 58.

Figure 7:
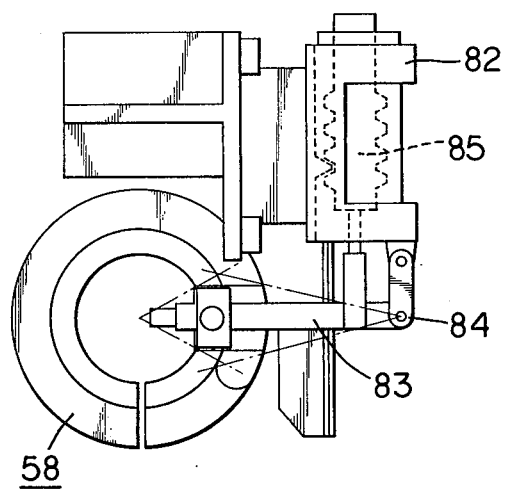
FIG. 7 is a plan view showing a profiling valve portion of the machine.
Figure 8:
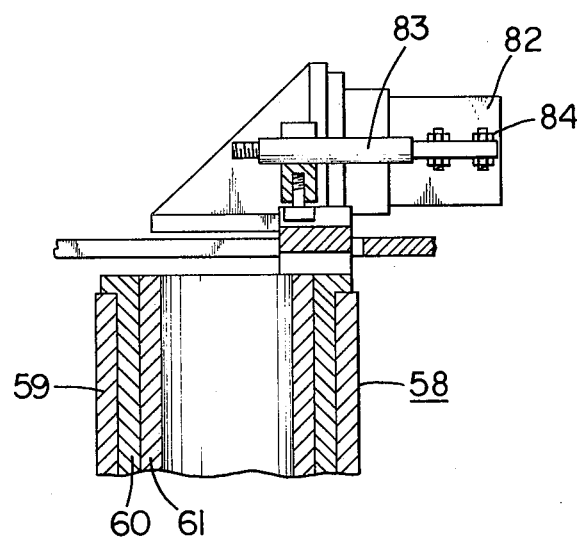
FIG. 8 is a vertical cross-sectional view of the above profiling valve portion.

In addition as shown in FIGS. 7 and 8, above the rotating cylinder 60 there is provided a driving lever 83 for a profiling valve 82, which driving lever 83 is adapted to shift the pneumatic circuit by causing a piston 85 to be linearly moved as lever 83 swings about a pivotal point 84. Lever 83 is slidably and pivotably connected to the rotating cylinder 60 so that the lever 83 swings in response to rotation of cylinder 60.

The profiling valve 82 is adapted to shift the pneumatic circuit for operating the abovementioned air cylinder 12 (as indicated by the dash-dot line in FIG. 1) in transversal reciprocating motion in order to move the delivery table 7 so as to maintain the fulcrum roller 42 in engagement with the template 31.

In the above described construction of the band sawing machine, work models or templates 31a, 31b of desired configuratin or profile are fixed to the delivery table 7 by means of a fixing member 32 in such a manner that the profiling surfaces of such models may face the rollers 42,43.

When delivering the work material to be worked onto the delivery table 7, there occurs a lowering motion of the feed roller 20 by the action of the air cylinder 26 which is actuated by a limit switch, and at the same time there takes place a delivery motion of the work material toward the table 8 by function of the motor 30. When the work material comes to a predetermined position on the jig table 8, the delivery motion is stopped by the action of another limit switch and the feed roller 33 is lowered in synchronism with this stopping of the delivery motion, thus delivering the work material toward the cutting position of the bandsaw blade 6 on the jig table 8. In this instance, the delivery table 7 will move longitudinally in the direction of the feed of the work material in accordance with the feed speed of the feed roller 23.

During the cutting feed of the material, the work model 31 is caused to abut the rollers 42,43 of the profile sensing member 35, and upon this abutting the displacement of the sensing roller 43 causes rotational displacement of shaft 41 which is detected in terms of a voltage by the displacement detecting device 45, thereby to rotate the motor 50 in the foward or reverse direction in accordance with the orientation and quantity of displacement of the sensing roller 43 so as to be transmitted to the bandsaw blade deflection operating devices 58. The bandsaw blade 6 is then deflected so that the cutting edge portion may be orientated accurately toward the desired cutting direction. As the blade is deflected by the devices 58, the rotary motion of cylinder 60 (and hence the displacement of the blade) is fed back to the cylinder 38 by the arms 80 and 49 and the interlocking rod 81. Cylinder 38 and stator 47 are thus angularly displaced to thereby cancel the output signal of device 45 when the adjusted position of the blade corresponds to the position of shaft 41 (and rollers 42 and 43), thereby stopping the motor 50.

Concurrently with the above described blade deflecting operation, the pneumatic circuit is shifted by function of the profiling valve 82, whereby the delivery table 7 and jig table 8 is caused to be driven in a direction at a right angle to the direction of delivery toward the bandsaw blade as the work model 31 is caused by travel forwardly or rearwardly from the rollers 42,43 of the profile sensing device 35 by function of the air cylinder 12 in accordance with the contours or profiles of the model 31, thus providing the working material with a due travel in accordance with the contours or profiles of the model or template 31 so as to obtain an accurate profiling cutting operation as desired.

When the cutting operation is completed on the work material, the limit switch is operated to cause the delivery table 7 or the jig table 8 to travel toward the right hand side away from the bandsaw blade as viewed in FIG. 1, then quickly returning such table linearly toward the original position thereof.

The profiling sensing device 35 is adapted to move in a vertical direction by the action of the air cylinder 36. With respect to the work models or templates 31a and 31b located one upon another on the fixing member 32, the sensing device 35 causes the rollers 42,43 to abut upon the lower model 31a of larger dimensions in the initial stroke thereof, and subsequently causes the rollers to abut upon the upper model 31b of smaller dimensions in the following stroke, thus permitting a desired curvilinear cutting operation on the both sides of the work material.

By virtue of the automatic profiling curvilinear cutting capability of the present invention are fully described above, the necessity of awkward and wearsome manual adjustments as encountered even in bandsawing operations along a slightly curved line when using a band sawing machine of conventional design and construction will be entirely eliminated by the application of the unique and convenient band sawing machine according to this particular invention. Owing to the specific and advantageous construction as described hereinbefore, it is now possible not only to perform precise curvilinear cutting operations on the work material, but also obtain a cut surface of beautiful finish, which has long been deemed practically impossible by the application of the band sawing machine of the conventional design and construction, thus contributing immensely to the achievement of such advantageous performance of curvilinear cutting operations of the character as hereinbefore described fully so effectively and reliably.

What is claim is:

1. In a bandsawing machine, the improvement comprising a profiling mechanism having a profile sensing member for sensing the profile of a work model, means for converting into an electrical signal the displacement of the sensing member by the model profile, the blade-twisting means responsive to the signal for twisting a short length of the bandsaw blade, including the cutting region thereof, about the cutting edge by an amount proportional to the displacement of the sensing member.

2. A machine according to claim 1, including means for feeding back the amount of blade twist to the profiling mechanism in opposition to the effect of displacement of the sensing member so that the amount of blade twist will be maintained proportional to the displacement of the sensing member.

3. A machine according to claim 2, in which the converting means includes electrical transducer means for providing the electrical signal, said transducer means having first and second relatively movable parts mechanically connected respectively to the sensing member and the means for feeding back, the electrical signal provided by said transducer means being dependent on the relative positions of said parts.

4. A machine according to claim 3, including means for manually adjusting the position of said first part.

5. A machine according to claim 2, including electric motor means responsive to the signal and arranged to rotate the blade-twisting means when energized.

6. A machine according to claim 2, in which the sensing member comprises a reference element and a pivotable element pivotable about the reference element, said elements being arranged and adapted to abut simulaneously on the model profile.

7. A machine according to claim 1, including means for feeding a workpiece in a first direction in dependence on the displacement of the sensing member, said first direction being transverse to the cutting direction of the blade.

8. A machine according to claim 7, in which the feeding means comprises a delivery table movable in the first direction and in a second direction which is transverse to the cutting direction and is substantially perpendicular to said first direction, and a jig table movable in the first direction but not in the second direction and coupled to the delivery table for movement therewith in said first direction, the jig table being provided with means for feeding a workpiece carried by the delivery table in said second direction, the tables having coplanar contiguous surfaces.

9. A machine according to claim 8, in which the jig table has a notch through which the blade extends.

10. A machine according to claim 7, including a pneumatically-operated drive for the feeding means, and a control valve arranged to control the drive and actuated by the blade-twisting means.

11. A machine according to claim 1, wherein there is provided backing roller means urged against said bandsaw blade by an adjustable resisting force, and means coacting with said backing roller means for stopping the cutting operation of the band sawing machine immediately when an overload is encountered during said cutting operation.

12. A machine according to claim 1, in which the sensing member comprises a reference element and a pivotal element pivotal about the reference element, said elements being arranged and adapted to abut simultaneously on the model profile.

13. A machine according to claim 3, including a feeding apparatus for feeding a workpiece to the blade in dependence on the displacement of the sensing member, the feeding apparatus including a delivery table movable in first and second substantially perpendicular directions which are each transverse to the cutting direction of the blade, the feeding apparatus also including a jig table movable in the first direction but not in the second direction and coupled to the delivery table for movement therewith in said first direction, the jig table being provided with means for feeding the workpiece carried by the delivery table in said second direction, the tables having adjacent and substantially coplanar surfaces.

* * * * *

UNITED STATES PATENT OFFICE
CERTIFICATE OF CORRECTION

Patent No. 4,014,235     Dated  March 29, 1977

Inventor(s) Toshihiro Fukami

It is certified that error appears in the above-identified patent and that said Letters Patent are hereby corrected as shown below:

Column 8, line 59; change "the blade" to ---and blade---.

Column 9, line 20; change "simulaneously" to

---simultaneously---.

Signed and Sealed this fifth Day of July 1977

[SEAL]

Attest:

RUTH C. MASON
Attesting Officer

C. MARSHALL DANN
Commissioner of Patents and Trademarks